US009912694B2

United States Patent
Hagar et al.

(10) Patent No.: US 9,912,694 B2
(45) Date of Patent: *Mar. 6, 2018

(54) DASHBOARDS FOR DISPLAYING THREAT INSIGHT INFORMATION

(71) Applicant: Proofpoint, Inc., Sunnyvale, CA (US)

(72) Inventors: David Eric Hagar, Mountain View, CA (US); Steve Eddy, Morgan Hill, CA (US)

(73) Assignee: Proofpoint, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/418,578

(22) Filed: Jan. 27, 2017

(65) Prior Publication Data

US 2017/0142154 A1   May 18, 2017

Related U.S. Application Data

(63) Continuation of application No. 13/913,231, filed on Jun. 7, 2013, now Pat. No. 9,602,523.

(Continued)

(51) Int. Cl.
*H04L 29/06* (2006.01)
*G06F 17/30* (2006.01)

(52) U.S. Cl.
CPC .... *H04L 63/1466* (2013.01); *G06F 17/30958* (2013.01); *H04L 63/1441* (2013.01)

(58) Field of Classification Search
None
See application file for complete search history.

(56) References Cited

U.S. PATENT DOCUMENTS 7,496,960 B1 * 2/2009 Chen .................. G06F 21/56
   726/22
7,516,488 B1 * 4/2009 Kienzle .............. H04L 12/585
   726/22

(Continued)

FOREIGN PATENT DOCUMENTS

EP   2859494 A2   4/2015
TW   201126367 A   8/2011

(Continued)

OTHER PUBLICATIONS

International Search Report and Written Opinion dated Jan. 3, 2014 in Patent Cooperation Treaty Application No. PCT/US2013/044823, filed Jun. 7, 2013, 8 pages.

(Continued)

*Primary Examiner* — Henry Tsang
(74) *Attorney, Agent, or Firm* — Carr & Ferrell LLP

(57) ABSTRACT

Dashboards for displaying threat insight information are provided herein, as well as systems and methods for generating the same. According to some embodiments, methods for providing a threat dashboard may include locating metrics regarding a malicious attack against a targeted resource, where the metrics indicate instances where users were exposed to the malicious attack or instances where a cloud-based threat detection system prevented the user from being exposed to the malicious attack. The method may also include rendering a threat dashboard for a web browser application of a client device, where the threat dashboard includes the located metrics.

19 Claims, 16 Drawing Sheets

Related U.S. Application Data

(60) Provisional application No. 61/656,920, filed on Jun. 7, 2012.

(56) References Cited

U.S. PATENT DOCUMENTS

| | | |
|---|---|---|
| 7,841,008 B1 | 11/2010 | Cole et al. |
| 8,099,785 B1 | 1/2012 | Pavlyushchik |
| 8,631,330 B1 | 1/2014 | Hwang et al. |
| 8,984,640 B1 | 3/2015 | Emigh et al. |
| 9,602,523 B2 | 3/2017 | Hagar et al. |
| 2003/0061506 A1* | 3/2003 | Cooper ............... H04L 12/2602 726/4 |
| 2007/0097976 A1* | 5/2007 | Wood ................. H04L 63/1416 370/392 |
| 2008/0147837 A1* | 6/2008 | Klein ................ H04L 29/12066 709/223 |
| 2009/0297043 A1 | 12/2009 | Hinton et al. |
| 2010/0235918 A1 | 9/2010 | Mizrahi et al. |
| 2011/0167474 A1 | 7/2011 | Sinha et al. |
| 2011/0244919 A1* | 10/2011 | Aller ................. G06K 9/00973 455/556.1 |
| 2012/0240183 A1 | 9/2012 | Sinha |
| 2013/0333028 A1 | 12/2013 | Hagar et al. |

FOREIGN PATENT DOCUMENTS

| | | |
|---|---|---|
| TW | 201141126 A | 11/2011 |
| TW | 201415281 A | 4/2014 |
| TW | I592821 | 7/2017 |
| WO | WO2001099373 A2 | 12/2001 |
| WO | WO2012011070 A1 | 1/2012 |
| WO | WO2013185101 A2 | 12/2013 |

OTHER PUBLICATIONS

Extended European Search Report dated Jan. 18, 2016 in European Patent Application No. 13799760.7 filed Jun. 7, 2013, 6 pages.
Taiwan Patent Application No. 102120416, "Office Action," dated Oct. 26, 2016, 8 pages.
Taiwan Patent Application No. 102120416, "Notice of Allowance," dated Mar. 13, 2017, 3 pages.
Non-Final Office Action, dated Nov. 14, 2014, U.S. Appl. No. 13/913,231, filed Jun. 7, 2013.
Final Office Action, dated May 21, 2015, U.S. Appl. No. 13/913,231, filed Jun. 7, 2013.
Non-Final Office Action, dated Feb. 2, 2016, U.S. Appl. No. 13/913,231, filed Jun. 7, 2013.
Final Office Action, dated Jul. 5, 2016, U.S. Appl. No. 13/913,231, filed Jun. 7, 2013.
Advisory Action, dated Oct. 18, 2016, U.S. Appl. No. 13/913,231, filed Jun. 7, 2013.
Notice of Allowance, dated Dec. 7, 2016, U.S. Appl. No. 13/913,231, filed Jun. 7, 2013.
"Notice of Allowance," European Patent Application No. 13799760.7, dated Nov. 6, 2017, 7 pages.

* cited by examiner

DASHBOARDS FOR DISPLAYING THREAT INSIGHT INFORMATION

CROSS REFERENCE TO RELATED APPLICATIONS

This application is a continuation of U.S. application Ser. No. 13/913,231, filed on Jun. 7, 2013 (issued as U.S. Pat. No. 9,602,523 on Mar. 21, 2017) which claims the benefit of U.S. Provisional Application No. 61/656,920, filed on Jun. 7, 2012, both of which are hereby incorporated by reference herein in their entirety.

FIELD OF THE PRESENT TECHNOLOGY

The present invention relates to the field of graphical user interfaces for computer systems and, and more specifically, but not by way of limitation, to cloud-based threat detection systems that generate threat insight dashboards for providing visibility into persistent threats. These threat dashboards may provide administrators and security professionals with the ability to identify one or more of malicious attacks, the scope of these attacks (for an organization or wider industry), which individuals are being targeted by the attacks, the nature of the attacks (e.g., malware, credential phishing, etc.), and possible remediation actions.

BACKGROUND

Malicious electronic messages may include, for example, spam, phishing, bulk, adult, and other similar content, which are designed to generate revenue. The messages may be in the form of email, instant messages, and the like. Although the description herein includes examples and other description of messages in the email context, the present invention is not limited to email messages. In addition, some types of malicious emails are designed to steal sensitive information such as bank account information, credit card account information, usernames and passwords, and social security numbers—just to name a few. Some malicious emails such as phishing emails will appear to be generated by a legitimate source, such as a merchant with which the end user conducts business. These emails may include logos, trademarks, and/or other source indicators used to make the email appear to be legitimate. These types of emails are often referred to as spoofed email or cloned emails. Some types of spoofed/cloned emails may be specifically targeted to certain individuals and are often referred to as spear phishing attacks.

With regard to spoofed emails, these malicious emails will also include a hyperlink appearing to be associated with a legitimate website operated by the merchant. Unfortunately, these hyperlinks are linked to malicious resources designed to steal sensitive information from end users. For example, the malicious resource may include a fake login page spoofing the login page of an online banking interface. When the end user enters their logon information, the logon information is exposed and captured.

SUMMARY

According to some embodiments, the present technology may be directed to methods providing a threat dashboard via a cloud-based threat detection system, where the cloud-based threat detection system comprising a CPU and a memory. The methods comprise: (a) locating metrics regarding a malicious attack against a targeted resource, the metrics indicating instances where users were exposed to the malicious attack or instances where the cloud-based threat detection system prevented the user from being exposed to the malicious attack; and (b) rendering a threat dashboard for a web browser application of a client device, the threat dashboard comprising the located metrics.

According to other embodiments, the present technology may be directed to a cloud-based threat detection system for providing a threat insight dashboard. The system comprises: (a) a processor; and (b) a memory for storing logic, the logic being executed by the processor to execute operations comprising: (i) providing a threat insight dashboard comprising metrics regarding a malicious attack against a targeted resource, the metrics indicating instances where users were exposed to the malicious attack or instances where the cloud-based threat detection system prevented the user from being exposed to the malicious attack; and (ii) rendering the threat dashboard for a web browser application of a client device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
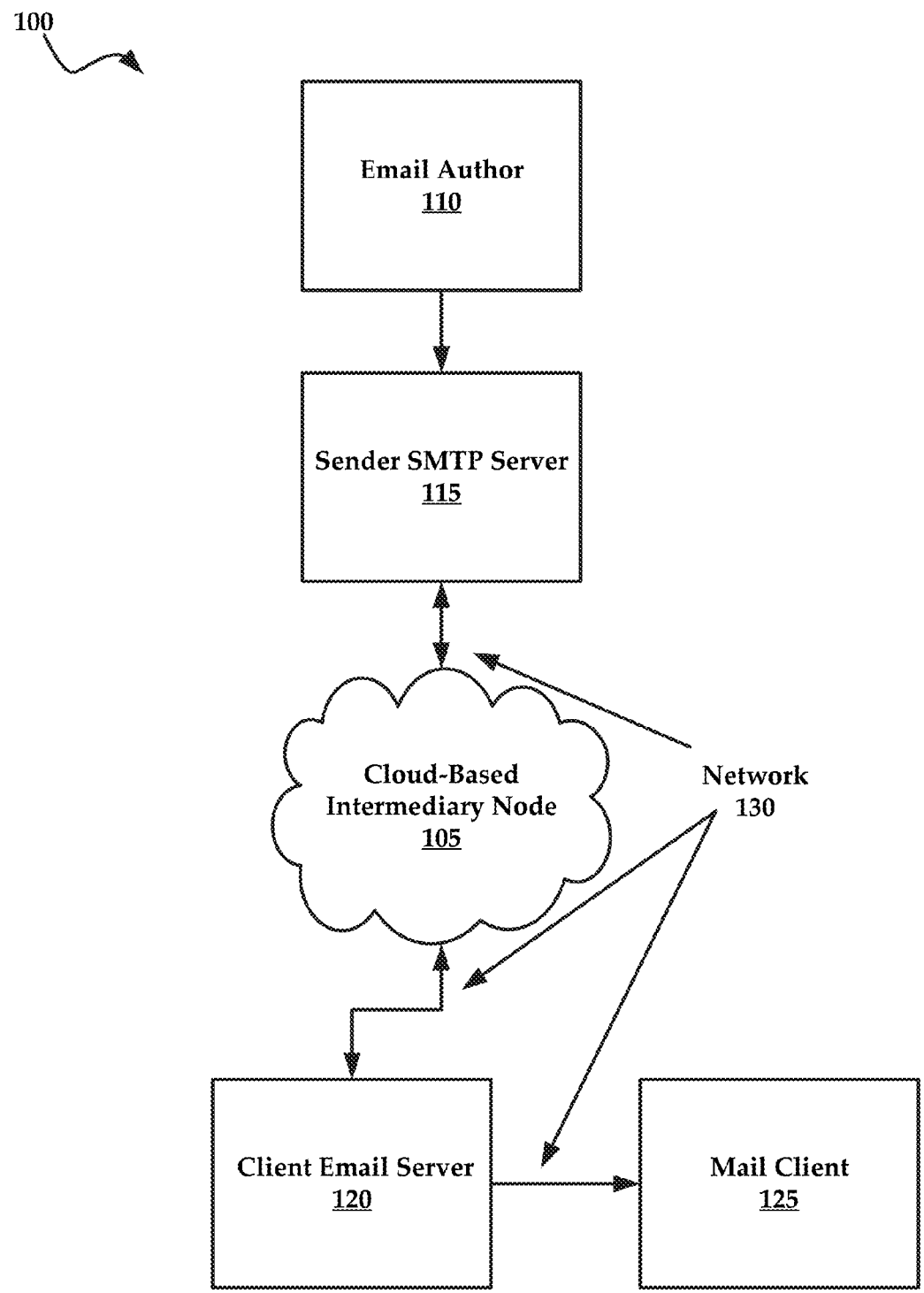
FIG. 1 illustrates an exemplary architecture for practicing aspects of the present technology.

While this technology is susceptible of embodiment in many different forms, there is shown in the drawings and will herein be described in detail several specific embodiments with the understanding the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology is directed to systems and methods for generating threat insight dashboards that provide users with visual metrics regarding malicious attacks against targeted resources such as computing systems, email messages, server, or other resources.

Dashboards generated by the present technology may provide unprecedented visibility into persistent threats, for example, through a unique threat insight dashboard, which will be described in greater detail with reference to FIGS. 12 and 13. The threat insight dashboard may include a web-based threat dashboard and/or configurable alerts that may allow administrators and security professionals the ability to identify one or more of malicious attacks, the scope of these attacks (e.g., just their organization or wider industry), which individuals are being targeted by the attacks, the nature of the attacks (i.e., malware, credential phishing etc.), and what remediation actions (if any) are necessary.

Exemplary processes for detecting malicious messages will be described herein as well to provide sufficient context for populating the various dashboards with metrics regarding malicious threats which were detected and neutralized by the cloud-based threat detection system.

In some instances, the present technology may provide location metrics for a particular threat, referred to as a "malicious attack." Fraudsters will often direct these malicious attacks against a particular entity or object, such as a web-page, a web-form within a web page, an email message, media content, a document, a server, a computing system, and so forth. The entity or object subject to the malicious attack will be referred to as a "targeted resource."

Malicious messages may be in the form of email, instant messages, and the like. Although the description herein includes examples and other description of messages in the email context, the present invention is not limited to email messages. More specifically, but not by way of limitation, the present technology may employ a cloud-based intermediary node (e.g., cloud-based threat detection system) that is configured to detect potentially malicious emails and confirm whether the email comprises malicious content. As background, a malicious email may include spam, adult, phishing, bulk, and/or other similar types of content. These emails serve to generate revenue for their respective authors, but are often an annoyance to the recipient, and may often be sent with nefarious intent. As mentioned above, some malicious emails may include links designed to deceive the recipient into disclosing sensitive information such as social security numbers, credit card numbers, and so forth.

If the email is likely to be malicious, the present technology may parse the email to determine if there are links included in the email that are associated with malicious resources. A malicious resource may include a spoofed website that is designed to induce the recipient into exposing their sensitive information, although other common malicious resources that would be known to one of ordinary skill in the art may likewise be detected by the present technology.

Once the present technology has determined an email includes a link to a potentially malicious resource, the present technology may exchange the link with an alternate link to a safe resource, such as a block webpage. The present technology may also modify the email to include a visual representation of the actual domain name of the potentially malicious resource so the recipient may see the true identity of the link. This feature may be advantageous in instances where the viewable text of the hyperlink is ambiguous and/or misleading. In some instances, access to the potentially malicious resource may be prohibited by deactivating or breaking the hyperlink such that the recipient cannot request or receive the resource by clicking on the hyperlink text. Hyperlinks embedded within images or other resources may also be processed in a similar manner. The present technology may also determine the link in an email is safe, i.e., certainly not malicious. For example, a link may be known to be safe since it is on a safelist or otherwise known to be safe.

The cloud-based threat detection system may also score email messages to determine a likelihood the email is malicious, as well as quarantining malicious emails, and generating blocklists of malicious resources, and safelists.

FIG. 1 illustrates an exemplary architecture 100 for practicing aspects of the present technology. According to some embodiments, the exemplary architecture 100, hereinafter "architecture 100," may generally include a cloud-based intermediary node, or cloud-based threat detection system hereinafter "intermediary node 105." Generally speaking, the intermediary node 105 may be configured to process emails by analyzing a link included in an email to determine if the link is associated with a potentially malicious resource and replacing the link with an alternate link to a trusted resource if the link is associated with a potentially malicious resource. In various embodiments, if the link is identified as being certainly malicious, the email is filtered and not delivered to the email server.

Provided below are various descriptions of scenarios where the intermediary node 105 detects and neutralizes malicious attacks, such as a phishing attack, against a targeted resource, such as an email message, or other similar targeted resource. It is noteworthy that many users may encounter or be exposed to such malicious attacks. Thus, the intermediary node 105 is capable of tracking the exposure of users to the malicious attack by analyzing information about the targeted resource. For example, the intermediary node 105 may track each instance of a user being exposed to the malicious attack, such as each email address to which the malicious attack was addressed.

The intermediary node 105 may also track other metrics such as (a) instances where users were exposed to the malicious attack; (b) instances where the intermediary node 105 prevented the user from being exposed to the malicious attack; (c) instances where users actuated the malicious attack; and (d) instances where the intermediary node 105 prevented the malicious attack from being actuated.

These metrics may be gathered for various users and tracked over a period of time. That is, the intermediary node 105 may track malicious attacks with reference to time. The intermediary node 105 may then use these time-referenced metrics to generate graphical or visual displays that may inform administrators about the threat profile of a malicious attack. Additional details regarding the tracking and display of metrics for malicious attacks will be provided with regard to FIGS. 12 and 13, which are described in greater detail infra.

In various embodiments, the intermediary node 105 may be configured to locate at least one uniform resource locator included in an email, analyzing the at least one uniform resource locator to determine if the at least one uniform resource locator is associated with a potentially malicious resource, and replace the at least one uniform resource locator with an alternate link to a trusted resource if the at least one uniform resource locator is associated with a potentially malicious resource.

According to some embodiments, the intermediary node 105 may be implemented within a cloud-based computing environment, i.e., cloud-based intermediary node 105. In general, a cloud-based computing environment is a resource typically combining the computational power of a large grouping of processors and/or combining the storage capacity of a large grouping of computer memories or storage devices. For example, systems providing a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Email authors 110 may compose emails delivered to a recipient by a sender server 115, which may include a server implementing simple mail transfer protocol ("SMTP"). Email authors 110 may compose both legitimate and/or malicious emails using an email program, which may include, for example, Outlook™, Entourage™, and so forth. The email author 110 may also compose and send emails using a web-based email interface. In a traditional configuration, the sender SMTP server 115 may deliver email messages directly to a client email server 120, which would deliver the email to a mail client 125, such as an email program or web-based email interface. The client email server 120 may comprise, for example, an enterprise email server such as Exchange™, Domino™, and so forth.

In accordance with the present technology, the intermediary node 105 may be positioned between the sender SMTP server 115 and the client email server 120. Thus, the intermediary node 105 may filter and/or process potentially/actually malicious emails before the emails are delivered to the client email server 120.

The components included in the architecture 100 may be communicatively coupled via a network 130. It is noteworthy to mention that the network 130 may include any one (or combination) of private or public communications networks such as the Internet.

Figure 2:
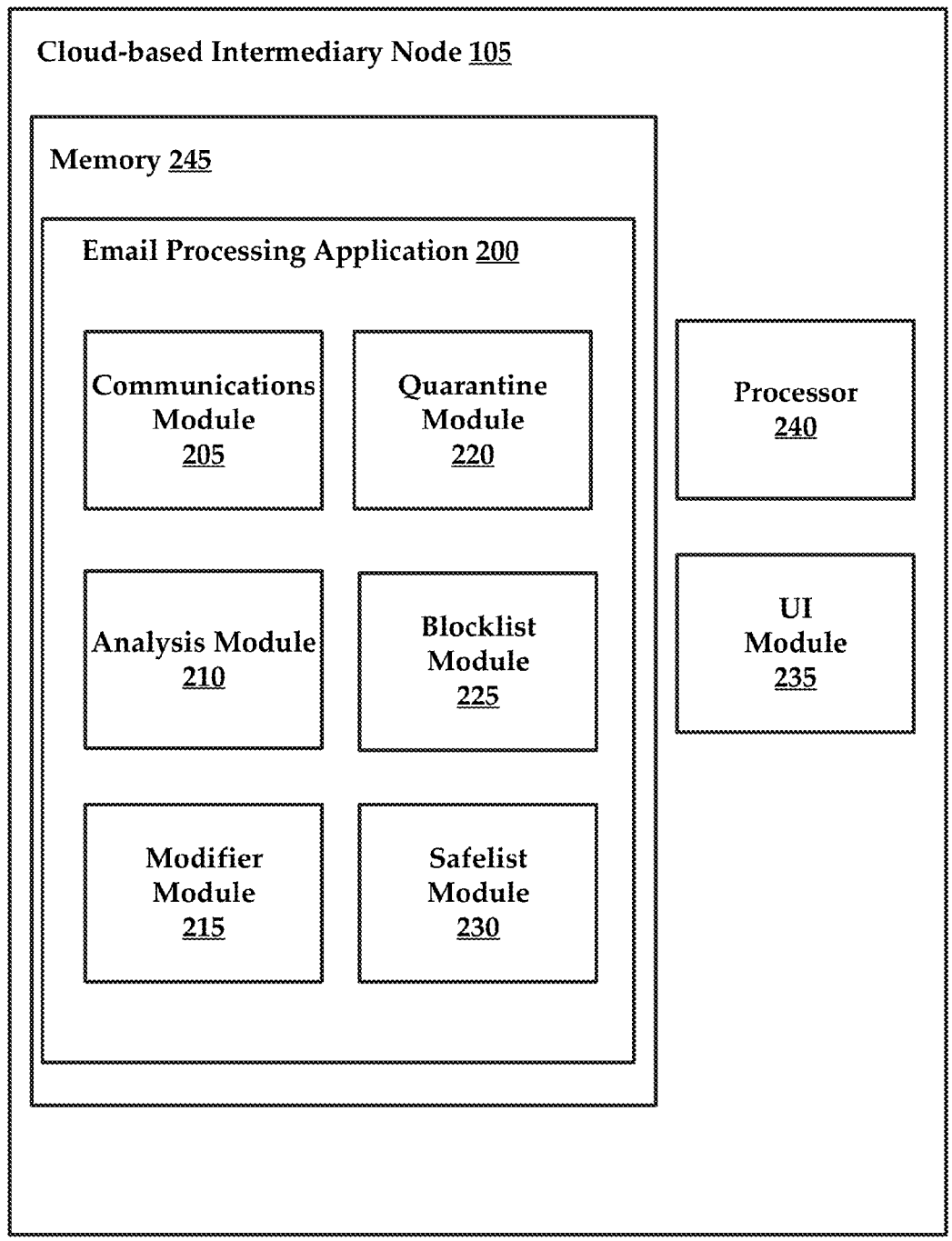
FIG. 2 is a block diagram of an exemplary email processing application for use in accordance with the present technology.

Referring now to FIG. 2, the cloud-based intermediary node 105 may include executable instructions that are stored in memory. These instructions may be executed by a processor of the intermediary node 105. An exemplary computing system including memory and a processor is described in greater detail with reference to FIG. 12. FIG. 2 includes a block diagram of an email processing application 200. According to some embodiments, when executed, the email processing application 200 may cause the intermediary node 105 to perform various methods for processing emails, which will be described in greater detail below.

According to some embodiments, the email processing application 200 may comprise a communications module 205, an analysis module 210, a modifier module 215, a quarantine module 220, and a blocklist module 225, and a safelist module 230. It is noteworthy that the email processing application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components providing the described functionality. In other embodiments, individual modules of the email processing application 200 may include separately configured web servers.

The email processing application 200 may reside within memory 245 of the intermediary node 105. The email processing application 200 may be stored as executable instructions executed by a processor 240. The processor 240 may be configured to control the functionalities of the intermediary node 105 described herein. That is, to provide the operations described in this disclosure, the processor 240 executes various instructions stored in memory 245. In some instances, the intermediary node 105 comprises a UI (User Interface) module 235 that generates threat insight dashboards. In some instances, the UI module 235 renders threat insight dashboards as web-based interfaces accessible by client devices, such as end user computing systems. Again, exemplary UIs (threat insight dashboards) are illustrated in FIGS. 12 and 13 and will be discussed in greater detail infra.

Figure 3:
FIG. 3 is an exemplary malicious email in the form of a spoofed email.

Generally speaking, the communications module 205 may receive email messages, both malicious and non-malicious, from various sender SMTP server systems, as shown in FIG. 1. FIG. 3 illustrates an exemplary malicious email 300 that spoofs the layout and content of an exemplary email sent by a trusted organization, such as a bank. This email 300 includes an exemplary link 305, such as a hyperlink. While the link appears to be associated with the domain name of the trusted organization, an examination of the source code of the email reveals the link 305 is actually associated with a potentially malicious resource. For example, the source code for the link 305 may specify "<A HREF="http://www.spammer.domain">http://www.yourtrustedbank.com/general/cust verifyinfo.asp</A>," where http://www.spammer.domain includes a potentially malicious resource.

Once an email is received, the analysis module 210 may be executed to evaluate the email and determine if a link included in the email is associated with a potentially malicious resource. It will be understood that the emails may be pre-processed by a general purpose spam filter to remove emails that are easily identifiable as being certainly, not just potentially, malicious, just by a review of content included in the email. For example, an email including textual content referencing adult material may be automatically classified as spam and deleted or quarantined.

In addition, the pre-processing of emails may include the generation of a trust/reputation/spam score for the email.

Figure 4:
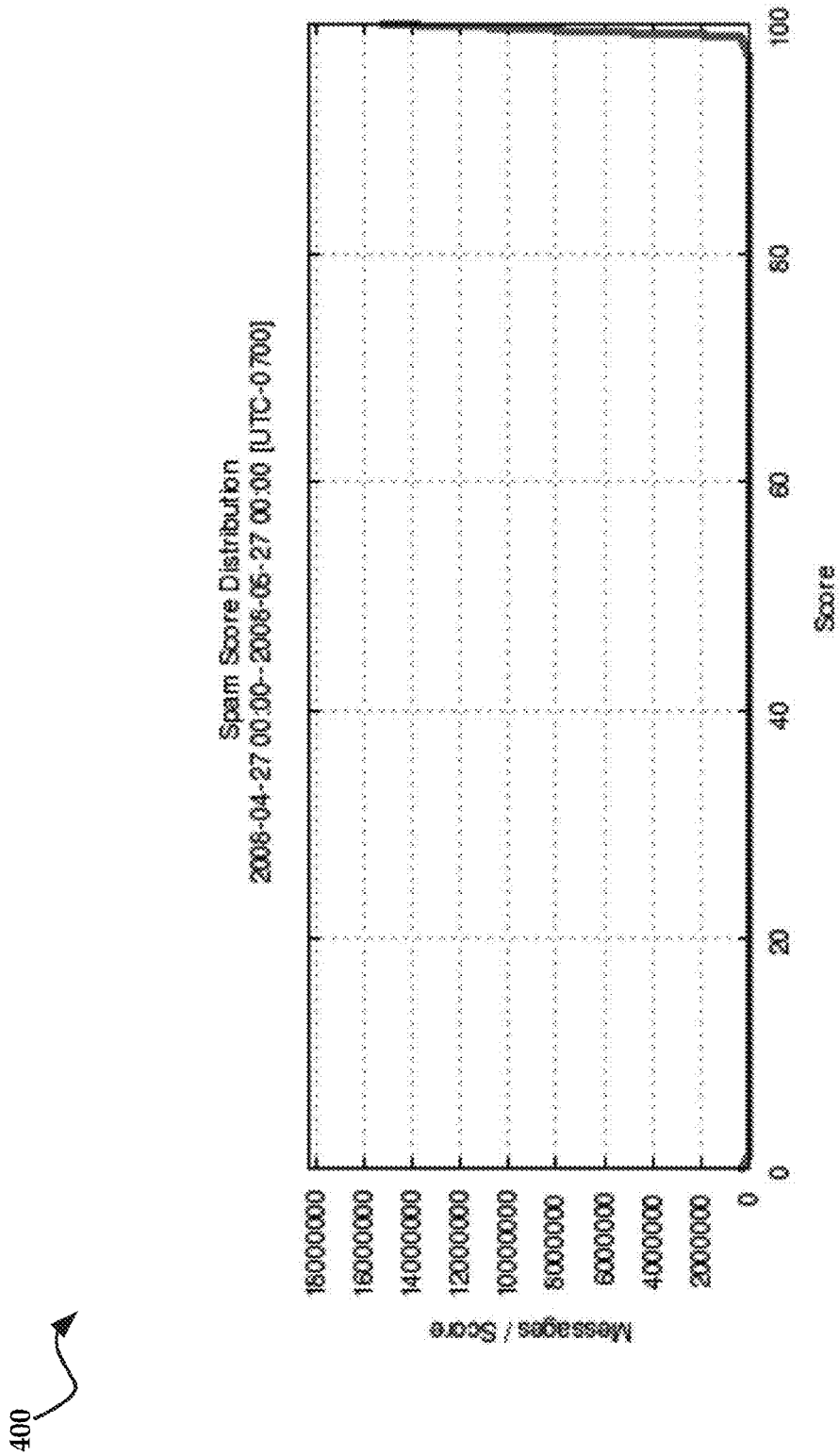
FIG. 4 is a graph of an exemplary distribution of spam scores generated for a plurality of email messages.

FIG. 4 illustrates a chart 400 which comprises an exemplary distribution of spam scores for a plurality of emails. As is shown, the vast majority of emails are, in fact, malicious. What is also apparent is that not all emails receive a score of zero (which indicates the email is definitely not malicious), or one hundred (which indicates the email is almost certain to be malicious). The present technology may aid in the processing of emails that receive a score somewhere between zero and one hundred (i.e., potentially malicious emails), although in some instances it may be advantageous to process all emails using the present technology. For example, email administrator may desire to identify and categorize as many malicious resources as possible to create a robust blocklist and a safelist, as will be described in greater detail below. In some embodiments, delivery of an email is temporarily delayed by the intermediate node 105, e.g., thirty minutes, in order to determine the disposition of an email message based on new information which might have been received during the delay period. After the delay period, the score of the message might be different and therefore, the associated action taken for the email may also be different.

Figure 5:
FIG. 5 is a table of exemplary spam rules that are utilized to categorize emails.

FIG. 5 illustrates an exemplary table 500 comprising various attributes of spam rules applied to emails by the pre-processing system mentioned above. As is shown, emails may be classified as definite spam (emails with a spam score of 100), phishing, adult, spam, bulk, suspect, and notspam. Again, the present technology may assist in further processing emails categorized as "suspect", i.e., potentially malicious.

Once emails have been received by the communications module 205, the analysis module 210 may be executed to evaluate links associated with the emails. Again, a link may comprise any of a uniform resource locator ("URL"), a uniform resource indicator ("URI"), an Internet protocol address ("IP"), a domain name, or combinations thereof. The link may comprise any hyperlink associated with online resource. These resources may be linked to any of text, an image, a video, an icon, or any other object that can be included in an email message that would be known to one of ordinary skill in the art with the present disclosure before them. For example, a hyperlink often includes a text string (e.g., "Click Here") that instructs or entices the recipient into clicking on the hyperlink.

The analysis module 210 may conduct an initial evaluation of any of the links associated with an email. The analysis module 210 may employ any one (or combination) of a number of techniques for preliminarily evaluating a link. For example, the analysis module 210 may evaluate an age of a domain name associated with an online resource. The analysis module 210 may automatically classify links associated with domains that were registered within a specific time period as potentially malicious. By way of non-limiting example, links to domains registered within the last three days may be classified as potentially malicious.

Once a link has been found to be associated with a potentially malicious resource, the modifier module 215 may be executed to replace the link associated with potentially malicious resource with an alternate link. In some instances, the link may be replaced with an alternate link associated with a trusted resource such as a landing page. In some instances, the landing page may comprise a block webpage (see FIG. 7). In various embodiments, the alternate link may include a redirection script that directs the recipient to a well known search page or other resource.

For example, the modifier module 215 may modify the source code of the email to replace the link associated with the potentially malicious resource. In some instances, the modifier module 215 may display an indicator associated with the potentially malicious resource proximate the link. Thus, the domain name associated with the potentially malicious resource may be exposed to the email recipient. In some instances, the modifier module 215 may deactivate the link. That is, the modifier module 215 may modify the link in the email to prevent the email recipient from opening the potentially malicious resource. Thus, if the email recipient clicks on the link, no action is performed (i.e., the potentially malicious resource is not returned).

In some embodiments, emails may be quarantined by the quarantine module 220 when the email has been categorized as potentially malicious or alternatively after the link associated with email has been verified as malicious.

According to some embodiments, emails that have been categorized as potentially malicious and quarantined may be re-evaluated by the analysis module 210 while quarantined. For example, if an email includes a link associated with a domain that has only recently been registered, subsequent evaluation of the link after a given period of time may reveal the domain name is associated with a legitimate resource. Thus, while the link was initially categorized as potentially malicious, the link was actually non-malicious. The email may be redelivered to the client email server 120 and finally to the mail client 125.

In other embodiments, the email may not be quarantined, but the link may be provisionally deactivated. When subsequent analysis reveals the link is associated with a legitimate resource, the link in the email may be reactivated and the email pushed/delivered to the mail client 125. The analysis module 210 may include comparing information regarding the potentially malicious resource to safelists, which may be private or publically available safelists. These safelists may comprise IP addresses, domain names, MAC addresses, or other computing system indicators that may be used to identify an online resource.

The analysis module 210 may also verify a potentially malicious resource is, in fact, malicious. The analysis module 210 may include comparing information regarding the malicious resource to blocklists, which may be private or publically available blocklists. These blocklists may comprise IP addresses, domain names, MAC addresses, or other computing system indicators that may be used to identify an online resource. In various embodiments, the analysis module 210 may also conduct a deep-content inspection of the potentially malicious resource by loading the potentially malicious resource in a sandbox (e.g., testing) environment on the intermediary node 105.

Other methods for verifying the malicious nature of an online resource that would be known to one of ordinary skill in the art are also likewise contemplated for use in accordance with the present technology.

According to some embodiments, once a link has been confirmed to be associated with a malicious resource, the blocklist module 225 may be executed to store identifying information for that resource in a blacklist for future reference. Conversely, according to some embodiments, once a link has been confirmed to be associated with a safe resource that is certainly not malicious, the safelist module 230 may be executed to store identifying information for that resource in a safelist for future reference.

Figure 6:
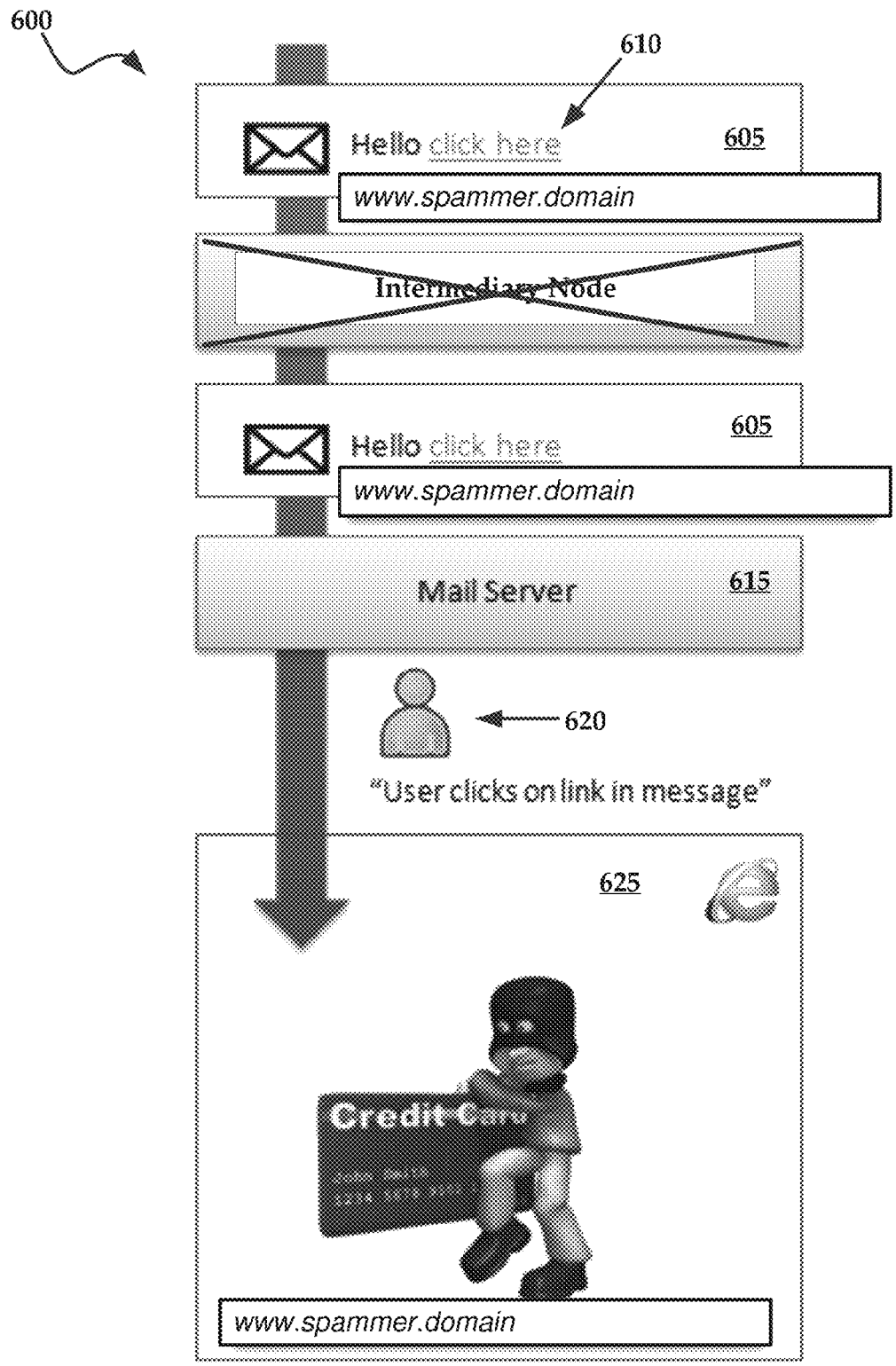
FIG. 6 is an exemplary flow diagram of a typical phishing attack.

FIG. 6 is a diagrammatical representation of a phishing attack 600 where a potentially malicious email is not intercepted or quarantined. Generally, a potentially malicious email 605 is received. The potentially malicious email 605 may comprise a link 610 to a potentially malicious resource. Because the potentially malicious email 605 is not processed by an intermediary node of the present technology, the email is received by the mail server 615 and passed through to a mail client 620. When the email recipient clicks on the link 610, a potentially malicious resource 625 is returned to the recipient. In this instance, the potentially malicious resource 625 may include a webpage designed to steal sensitive information from the recipient.

Figure 7:
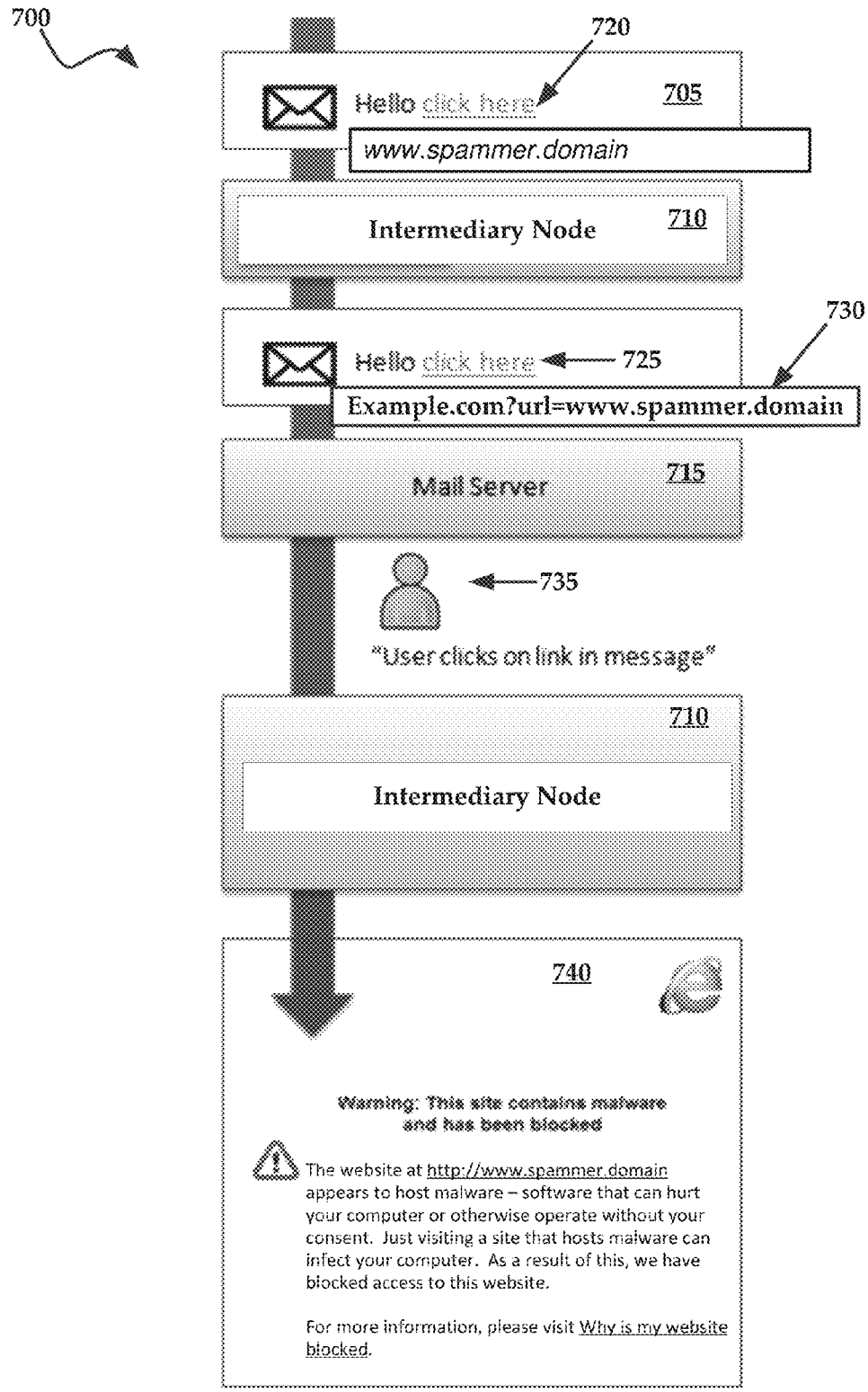
FIG. 7 is a diagrammatical representation of a phishing attack where a malicious email is detected and processed by the present technology.

FIG. 7 is a diagrammatical representation of a phishing attack 700 where a potentially malicious email 705 is intercepted by the present technology. Generally, a potentially malicious email 705 is received by an intermediary node 710 prior to delivery to the mail server 715. The potentially malicious email 705 may comprise a link 720 to a potentially malicious resource. The intermediary node 710 may replace the link 720 with an alternate link 725. Additionally, the intermediary node 710 may modify the email to include an indicator 730 that includes at least a portion of the domain associated with the potentially malicious resource (e.g., url=www.spammer.domain). In some instances, the indicator 730 may be displayed in parentheses, or in any other manner that causes the domain of the potentially malicious resource to be set apart or distinctive, and thus more visually distinct to the email recipient. The indicator 730 may be configured for other indications depending on the various applications and user needs.

Figure 8A:
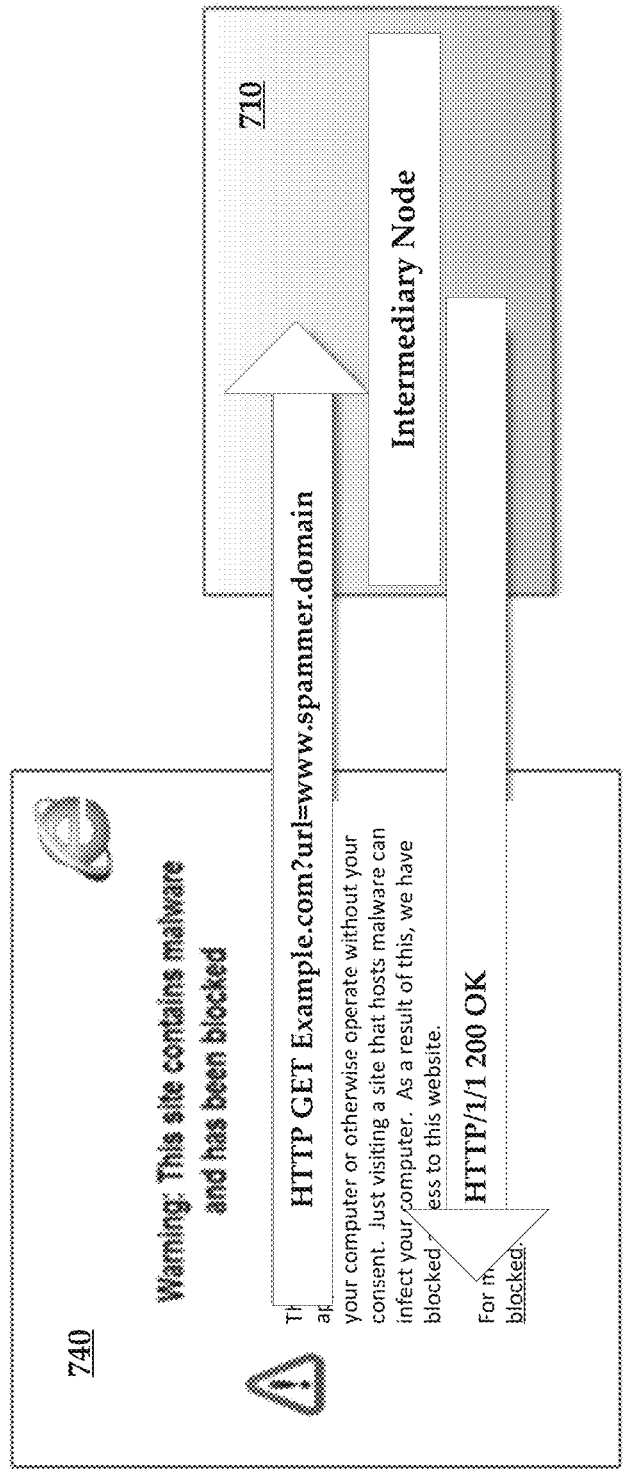
FIG. 8A is a diagrammatical representation of the provision of a landing page.
Figure 8B:
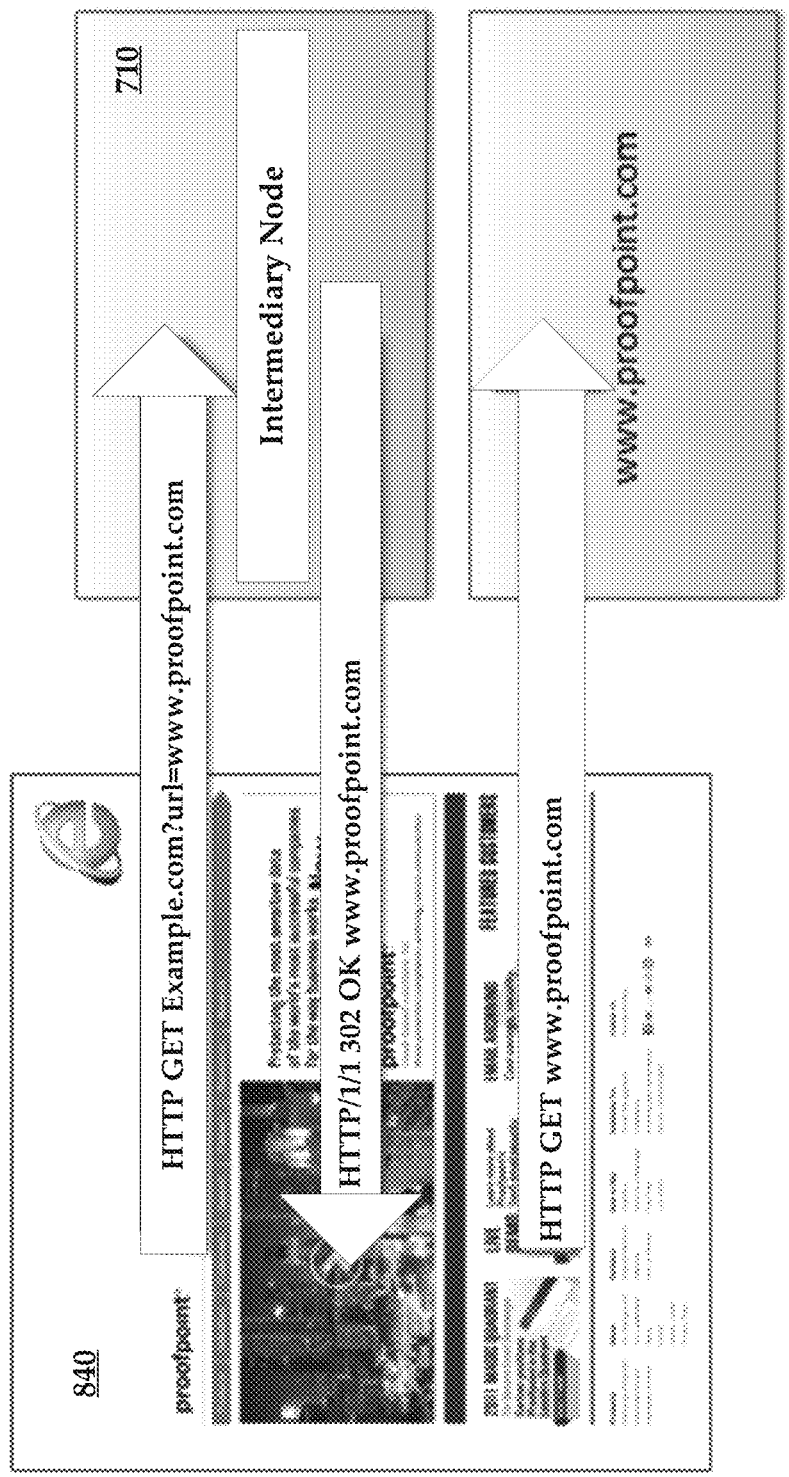
FIG. 8B is a diagrammatical representation of the provision of redirecting to an original link that is determined to be a valid, i.e., not potentially malicious, link.

When the email recipient 735 clicks on the alternate link 725, the intermediary node 710 provides the email recipient with a landing page 740, which in this embodiment comprises a block page notifying the email recipient that the original link was associated with a potentially malicious resource. FIG. 8A illustrates the intermediary node 710 requesting a potentially malicious resource and returning a landing page 740. FIG. 8B illustrates an exemplary embodiment wherein the intermediary node 710 returns a HTTP 302 redirect to the original link determined by the intermediary node 710 to be a valid, i.e., not potentially malicious, link. As shown in this example, it is totally transparent to the end user that clicking the link resulted in contacting the intermediary node 710 first before opening the actual webpage at the link.

Figure 9:
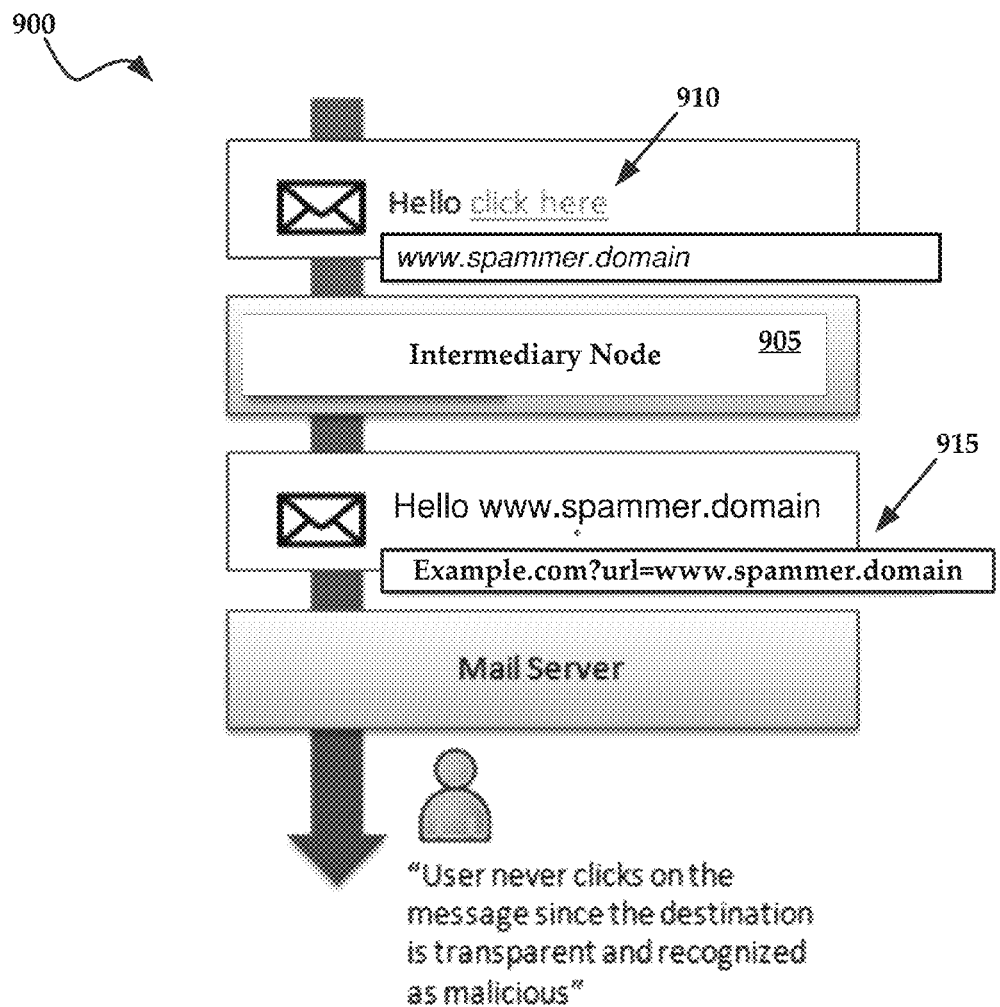
FIG. 9 is another diagrammatical representation of a phishing attack where a malicious email is detected and processed by the present technology.

FIG. 9 is a diagrammatical representation of a phishing attack 900 where a potentially malicious email is intercepted by the present technology. In this instance, an intermediary node 905 may rewrite a link 910 associated with a potentially malicious resource in order to show transparency, e.g., the actual link ("www. spammer.domain"); so the end user can make a better and more informed decision whether to click on this link or not. In some embodiments, the intermediary node 905 may also display an indicator 915 for the link 910.

Figure 10:
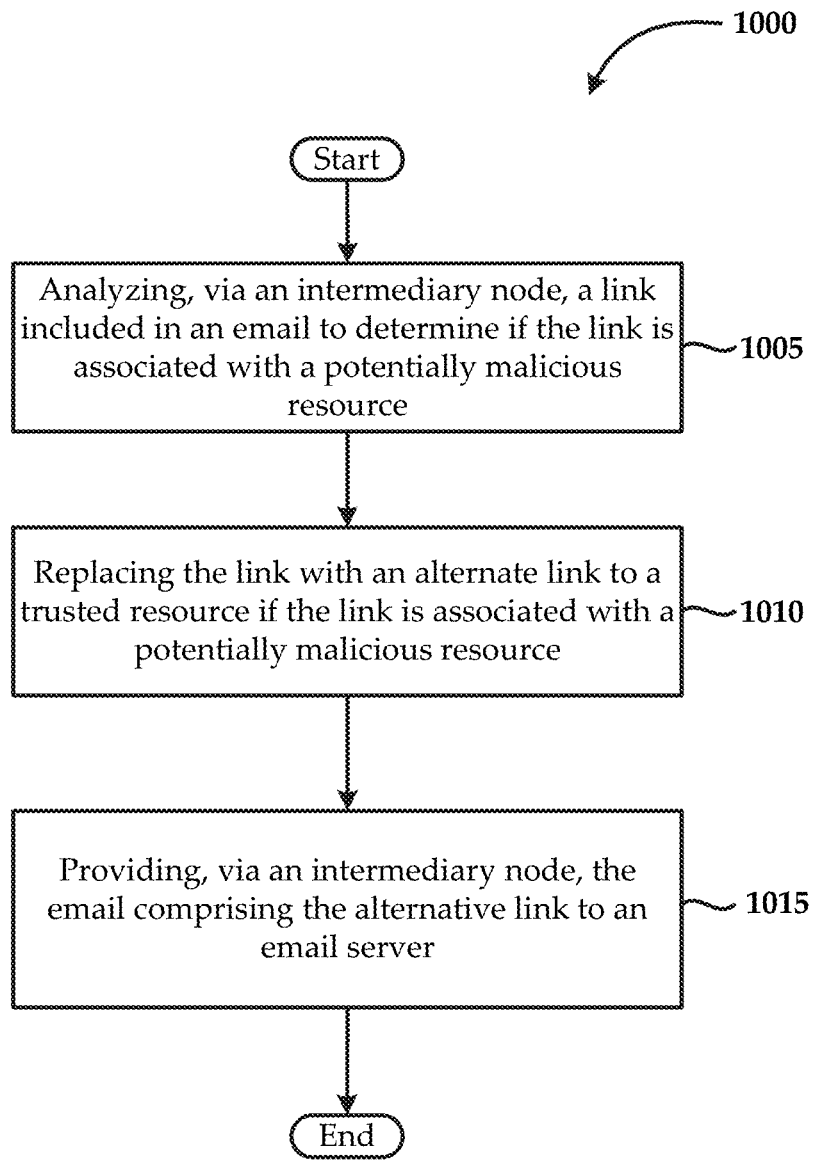
FIG. 10 is a flowchart of an exemplary method for processing emails in accordance with the present disclosure.

FIG. 10 is a flowchart of an exemplary method for processing emails. The method 1000 may comprise a step 1005 of analyzing, via the intermediary node, a link included in an email to determine if the link is associated with a potentially malicious resource. The method may also comprise a step 1010 of replacing the link with an alternate link to a trusted resource if the link is associated with a potentially malicious resource, as well as a step 1015 of providing, via an intermediary node, the email comprising the alternative link to an email server.

Figure 11:
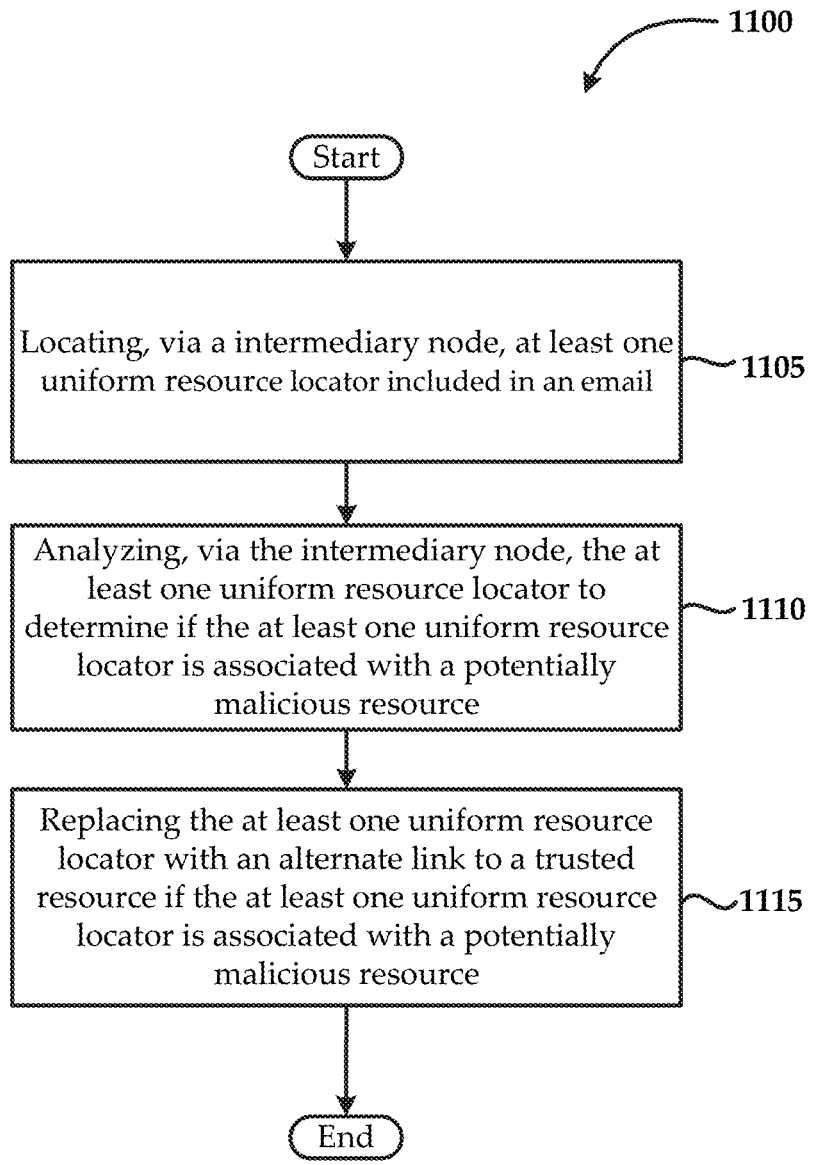
FIG. 11 is a flowchart of another exemplary method for processing emails in accordance with the present disclosure.

FIG. 11 is a flowchart of another exemplary method for processing emails. The method 1100 may comprise a step 1105 of locating, via the intermediary node, at least one uniform resource locator included in an email. The method may also comprise a step 1110 of analyzing, via the intermediary node, the at least one uniform resource locator to determine if the at least one uniform resource locator is associated with a potentially malicious resource, as well as a step 1115 of replacing the at least one uniform resource locator with an alternate link to a trusted resource if the at least one uniform resource locator is associated with a potentially malicious resource.

With regard to the generation of threat insight dashboards, the intermediate node 105 may be configured to track metrics regarding malicious attacks against various targeted resources. That is, the intermediate node 105 may be configured to track descriptive information related to malicious attacks, such as those malicious attacks described above, namely spam, phishing, Trojan horse, and so forth.

One of ordinary skill in the art will appreciate that a malicious attack may be directed towards a targeted resource or a plurality of targeted resources. That is, a malicious attack may be directly targeted or disseminated in a widespread manner. When a malicious attack is distributed in a widespread manner, individual or direct targeting of resources may not occur. For example, a direct targeting of a resource may include a phishing attack against a particular email address or email server. A widespread attack may include, for example, a malicious spam email campaign indiscriminately launched against any available email address. With regard to the present disclosure, a malicious attack against a targeted resource may include both individual/direct targeted attacks and/or widespread malicious attacks.

In general, malicious attack related information may be referred to generally as "metrics." The metrics of a malicious attack may include, but are not limited to: (a) instances where users were exposed to the malicious attack; (b) instances where the cloud-based threat detection system (the intermediary node 105) prevented the user from being exposed to the malicious attack; (c) instances where users actuated the malicious attack; and (d) instances where the cloud-based threat detection system prevented the malicious attack from being actuated. Metrics for a malicious attack may include any combination of the aforementioned metrics.

The "actuation" of a malicious attack will be understood to include any action taken by a user that attempts to launch or execute a malicious attack. For example, an actuation of a phishing attack may include a user filling out a malicious web form.

The intermediary node 105 may be configured to generate various graphs or visual representations of malicious attack metrics. FIGS. 12 and 13 are threat insight dashboards each including one or more exemplary graphs and/or visual representations of metrics regarding a malicious attack.

Figure 12:
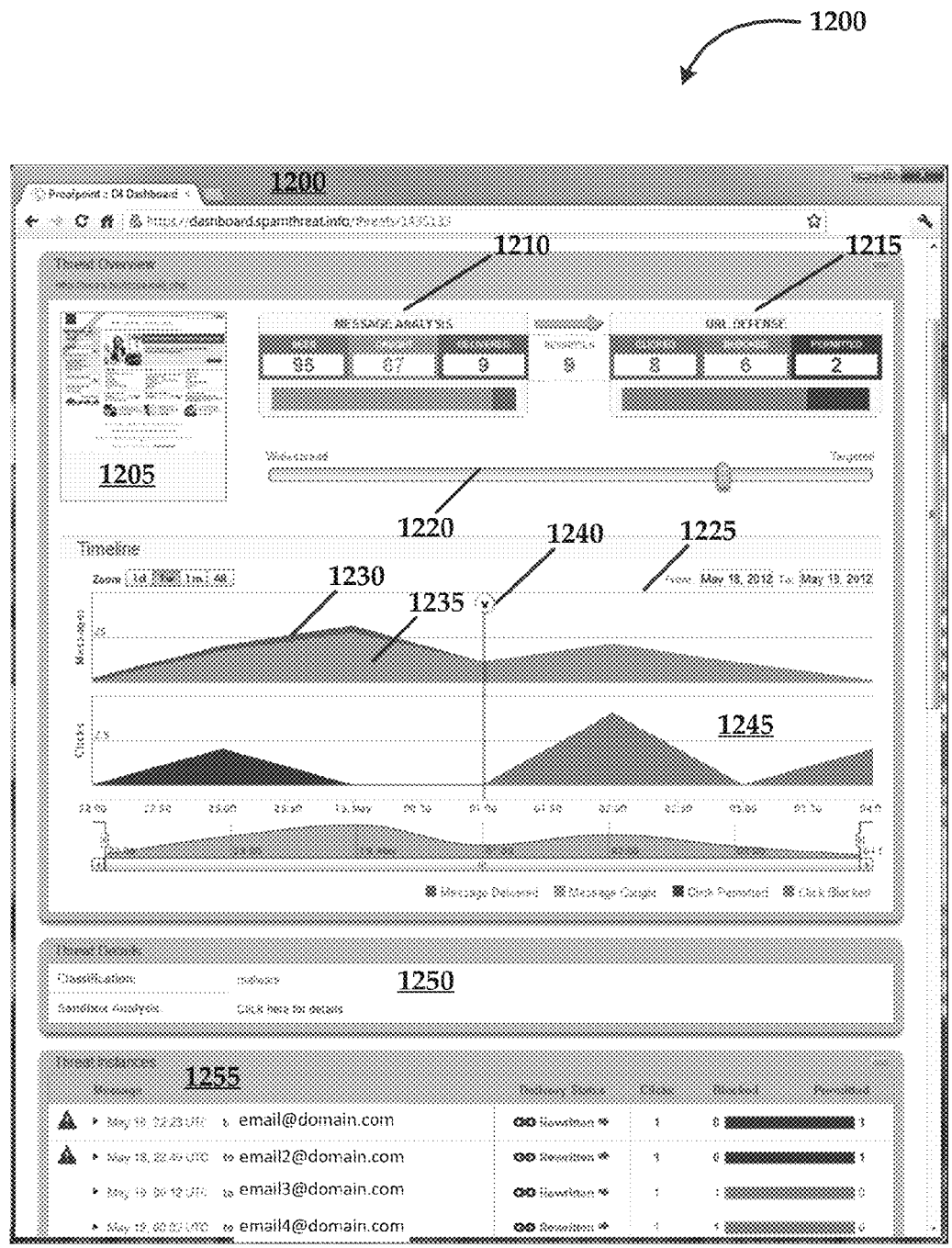
FIG. 12 is an exemplary graphical user interface in the form of a threat insight dashboard.

In more detail, FIG. 12 includes a Threat Insight Dashboard UI 1200. This UI 1200 may be generated by the intermediary node 105. Specifically, the UI 1200 may be generated by the UI module 235 of the intermediary node 105. The UI 1200 has been rendered in a web-browser format suitable for display by the web browser client of the client device (end user computing system) that is being utilized by an end user to both interact with the intermediary node 105 and view threat insight dashboards.

In the example in FIG. 12, the UI 1200 also may include the actual location identifier for the malicious attack, which is specified as "http://nasa.hu/dzsemi/j.php." The UI 1200 also includes a representation of the targeted resource 1205 that was determined by the intermediary node 105 to be compromised by a malicious attack. That is, the intermediary node 105 identified that a malicious attack as being associated with the targeted resource 1205, using any of the malicious detection methods described above.

The UI 1200 may also include a "Message Analysis" counter 1210 that includes metrics such as metrics (a) and (b) described above, as well as a metric related to how many of the (a) instances were not caught by the intermediary node 105 and were permitted to be passed to end users. The UI 1200 may also include a "URL Defense" counter 1215 that includes metrics such as (c) and (d), as well as a metric related to instances where a user actuated a threat and that the threat was actually permitted to execute for the end user. Generally, the URL Defense counter 1215 indicates instances where users have been exposed to a malicious attack. These instances generally occur at the beginning of the malicious attack, before the intermediary node 105 has learned how to identify and neutralize the malicious attack.

The UI 1200 may also include an attack categorization slider 1220 that indicates whether the attacks associated with the malicious attack were, in fact, directly targeted or more widespread. That is, the closer the slider 1220 is positioned towards the targeted end, the more the malicious attack has been categorized by the intermediary node 105 as behaving as a truly targeted attack, meaning a malicious attack has been directed at a particular targeted resource or a group of users. In contrast, a widespread attack is less focused towards a target, being more general and less discriminative in its intended victims.

The UI 1200 may also include two "Timeline" graphs that display various metrics over a given period of time. The time periods displayed are selectable by the user, such that the metrics may be displayed for a single day, a week, or a month, or potentially over a user-defined period of time.

In some instances, the UI may include a two dimensional graph 1225 having a vertical axis defined by exposures to the targeted attack (Messages) and a horizontal axis defined by a period of time. In this instance, the graph 1225 includes instances where users were exposed to the malicious attack such as a malicious email message, and instances where the intermediary node 105 prevented the user from being exposed to the malicious email message. To help visually distinguish metrics, the intermediary node 105 may assign a different hue to each of the metrics. For example, the message exposure metrics 1230 may be shown in a first hue, while the exposure prevented metrics 1235 may be shown in a second hue.

The UI 1200 may also include a threat neutralization indicator 1240 on the graph 1225. The threat neutralization indicator 1240 illustrating a point in time where the intermediary node 105 neutralized the malicious attack. When viewed on a timeline, the user may visually ascertain how long it took for the intermediary node 105 to identify the malicious attack, as well as how long it took for the intermediary node 105 to neutralize the malicious attack, which includes preventing users from being exposed to the malicious attack.

The UI 1200 may also include a second graph 1245 created similarly to the graph 1225 with the exception that the second graph 1245 includes metrics such as instances where users actuated (e.g., clicked) the malicious attack; and (d) instances where the cloud-based threat detection system prevented the malicious attack from being actuated.

The UI 1200 may also include a "Threat Details" pane 1250 that includes descriptive information about the malicious attack. This Threat Details pane 1250 may also include information or metrics gathered about the attack from a sandbox environment. A sandbox environment includes a physical or virtual computing system used as an exemplary environment in which to test and measure the effects of a potentially malicious attack. Information gathered from this testing may be made available to the user through this pane. For example, the user may click on a link that takes the user to a more detailed sandbox analysis page (not shown).

According to some embodiments, the UI 1200 includes a "Threat Instances" List 1255 that includes a list populated with threat instances where users encountered or actuated the malicious attack. In some embodiments, the intermediary node 105 organizes the list such that instances where users actuated the malicious attack are displayed above instances where users encountered but did not actuate the malicious attack. Each row within the Threat Instances list 1255 may include an identifier indicating the email address targeted by the malicious attack and a delivery status indicating if the intermediary node 105 was able to rewrite the malicious message. The Threat Instances list 1255 may also include a column indicating how many times the user clicked on the malicious attack, as well as a column indicating whether the click was "permitted" or "blocked" by the intermediary node 105.

Figure 13:
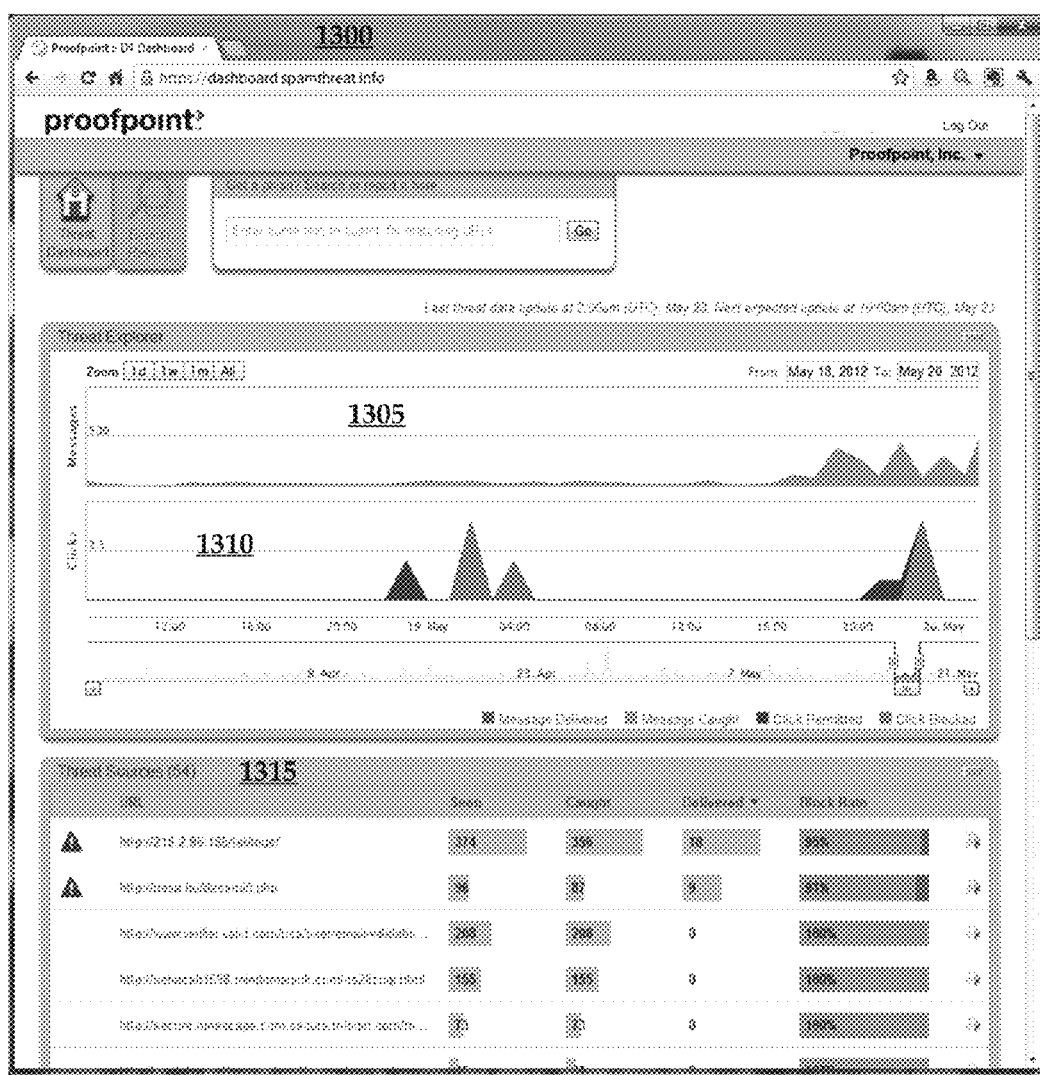
FIG. 13 is another exemplary graphical user interface in the form of a threat insight dashboard.

FIG. 13 illustrates another exemplary threat insight dashboard UI 1300. This UI 1300 includes "Threat Explorer" timeline graphs 1305 ("messages") and 1310 ("clicks"), which are generated by the intermediary node 105 in a manner similar to the graphs of FIG. 12. These threat incidents are organized by the intermediary node 105 according to threat sources, rather than specific malicious attacks that are directed at a targeted resource.

The UI 1300 may include a "threat source" list 1315 that comprises a ranked listing of malicious attack sources. Each row within the threat source list 1315 may include a location identifier for a malicious attack, as well as metrics for the attack, arranged into various columns. For example, for a given malicious attack source, the malicious attack may be seen by users, caught, delivered, or blocked by the intermediary node 105 a certain number of times. In general, these categories of metrics represent categories (a), (b), (c), and (d) described in greater detail above.

The malicious attacks included in the threat source list 1315 may be arranged according to exposure or actuation success. For example, the malicious attacks delivered the most frequently are ranked highest. This information allows the user to quickly identify how successful or dangerous the malicious attack was, relative to the respective end users exposed. The user may return to the dashboard of FIG. 12 to specifically identify the users affected by the malicious attack. That is, the user may reference the Threat Instances list 1255 of FIG. 12 for users associated with a particular email address, which was identified in a malicious attack.

Figure 14:
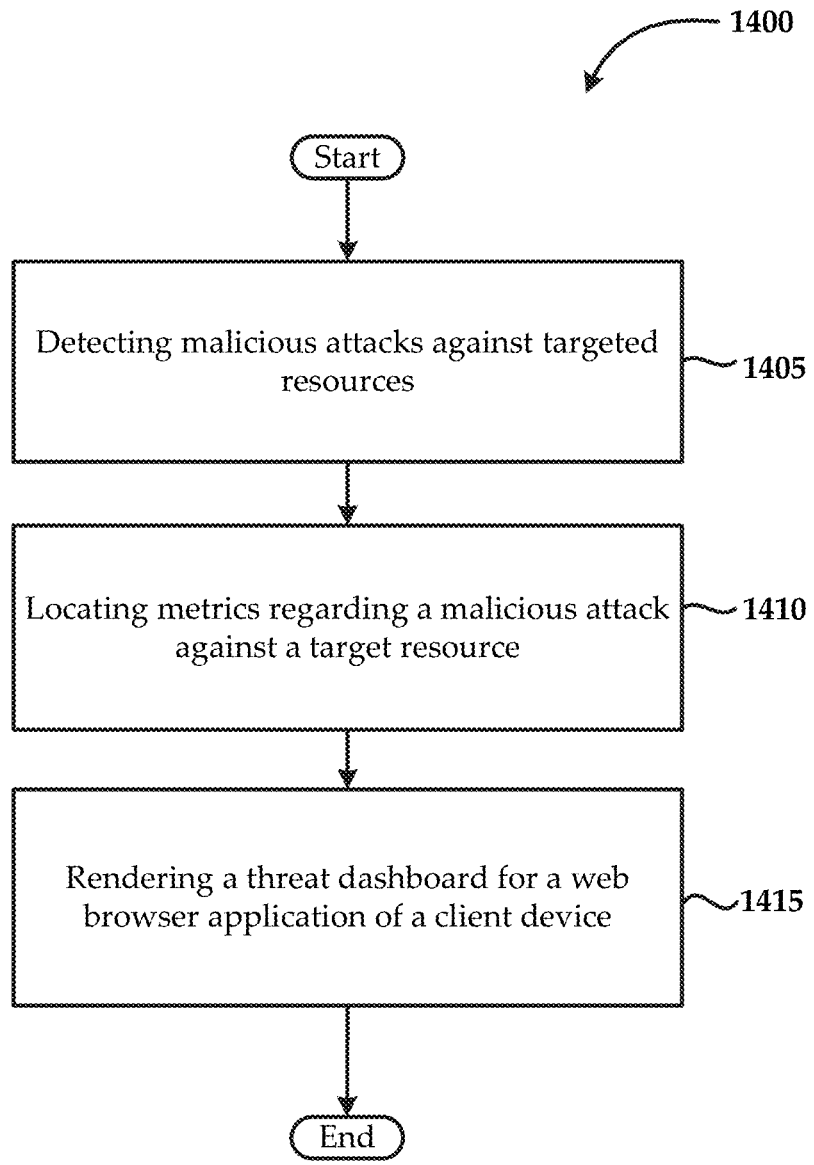
FIG. 14 is a flowchart of an exemplary method for providing a threat dashboard via a cloud-based threat detection system.

FIG. 14 is a flowchart 1400 of an exemplary method for providing a threat dashboard via a cloud-based threat detection system (e.g., an intermediary node 105). The cloud-based threat detection system generally comprises a CPU and a memory. In some instances, the method may include detecting malicious attacks against targeted resources (1405). Again, the malicious attacks may include phishing attacks, spam, Trojan horse attacks, and so forth. The targeted resource may include a web page, an email address, a document, a server, an end user computing device, or other similar resources that would be known to one of ordinary skill in the art as being susceptible to malicious attacks.

The method may also include locating metrics regarding a malicious attack against a targeted resource (1410). As described in greater detail above, the metrics indicate instances where users were exposed to the malicious attack or instances where the cloud-based threat detection system prevented the user from being exposed to the malicious attack.

The method may also include rendering a threat dashboard for a web browser application of a client device (1415). It will be understood that the threat dashboard comprises the located metrics.

Figure 15:
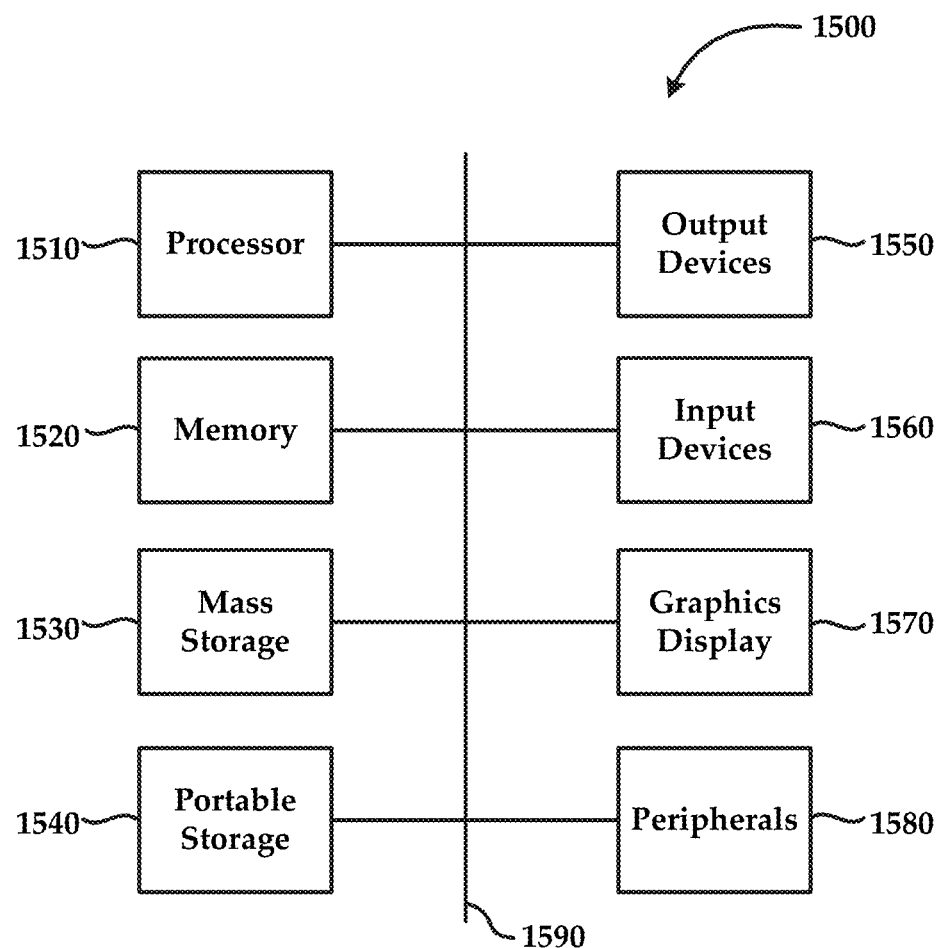
FIG. 15 is a block diagram of an exemplary computing system for implementing embodiments of the present technology.

FIG. 15 illustrates an exemplary computing system 1500 that may be used to implement an embodiment of the present technology. The system 1500 of FIG. 15 may be implemented in the contexts of the likes of computing systems, networks, servers, or combinations thereof. The computing system 1500 of FIG. 15 includes one or more processors 1510 and main memory 1520. Main memory 1520 stores, in part, instructions and data for execution by processor 1510. Main memory 1520 may store the executable code when in operation. The system 1500 of FIG. 15 further includes a mass storage device 1530, portable storage medium drive(s) 1540, output devices 1550, input devices 1560, a graphics display 1570, and peripheral device(s) 1580.

The components shown in FIG. 15 are depicted as being connected via a single bus 1590. The components may be connected through one or more data transport means. Processor unit 1510 and main memory 1520 may be connected via a local microprocessor bus, and the mass storage device 1530, peripheral device(s) 1580, portable storage medium drive(s) 1540, and graphics display 1570 may be connected via one or more input/output (I/O) buses.

Mass storage device 1530, which may be implemented with a magnetic disk drive or an optical disk drive, is a non-volatile storage device for storing data and instructions for use by processor unit 1510. Mass storage device 1530 may store the system software for implementing embodiments of the present invention for purposes of loading that software into main memory 1520.

Portable storage medium drive(s) 1540 operates in conjunction with a portable non-volatile storage medium, such as a floppy disk, compact disk, digital video disc, or USB storage device, to input and output data and code to and from the computer system 1500 of FIG. 15. The system software for implementing embodiments of the present invention may be stored on such a portable medium and input to the computer system 1500 via the portable storage medium drive(s) 1540.

Input devices 1560 provide a portion of a user interface. Input devices 1560 may include an alphanumeric keypad, such as a keyboard, for inputting alpha-numeric and other information, or a pointing device, such as a mouse, a trackball, stylus, or cursor direction keys. Additionally, the system 1500 as shown in FIG. 15 includes output devices 1550. Suitable output devices include speakers, printers, network interfaces, and monitors.

Graphics display 1570 may include a liquid crystal display (LCD) or other suitable display device. Graphics display 1570 receives textual and graphical information, and processes the information for output to the display device.

Peripheral device(s) 1580 may include any type of computer support device to add additional functionality to the computer system. Peripheral device(s) 1580 may include a modem or a router.

The components provided in the computer system 1500 of FIG. 15 are those typically found in computer systems that may be suitable for use with embodiments of the present invention and are intended to represent a broad category of such computer components that are well known in the art. Thus, the computer system 1500 of FIG. 15 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing a threat dashboard via a cloud-based threat detection system, the cloud-based threat detection system comprising a Central Processing Unit (CPU) and a memory, the method comprising the steps of:
    preventing, via the cloud-based threat detection system, users from actuating a particular malicious attack, the particular malicious attack being from a particular malware;
    determining metrics regarding the particular malicious attack against a targeted resource, the metrics indicating:
        instances where the users actuated the particular malicious attack, and
        instances where the cloud-based threat detection system prevented the particular malicious attack from being actuated;
    rendering a threat dashboard for a web browser application of a client device, the threat dashboard comprising the metrics for the instances where the users actuated the particular malicious attack and the instances where the cloud-based threat detection system prevented the particular malicious attack from being actuated; and
    indicating on the threat dashboard whether the particular malicious attack was targeted to a particular group of the users or widespread.

2. The method of claim 1, wherein the indicating whether the particular malicious attack was targeted to the particular group of the users or widespread further includes providing a slider for categorizing attacks, the slider having a targeted end and a widespread end.

3. The method of claim 1, wherein the metrics further indicate instances where the users were exposed to the particular malicious attack or instances where the cloud-based threat detection system prevented the users from being exposed to the particular malicious attack.

4. The method of claim 3, wherein the rendering includes graphing a timeline of the metrics to illustrate both:
  (a) the instances where the cloud-based threat detection system prevented the users from being exposed to the particular malicious attack; and
  (b) the instances where the cloud-based threat detection system prevented the particular malicious attack from being actuated;
the rendering including graphing the timeline of the metrics to further indicate:
  (c) the instances where the users were exposed to the particular malicious attack; and
  (d) the instances where the users actuated the particular malicious attack.

5. The method of claim 4, wherein the graph has a vertical axis defined by exposures and a horizontal axis defined by a period of time, the timeline being populated with (a) instances and (c) instances.

6. The method of claim 4, wherein the graph has a vertical axis defined by actuations and a horizontal axis defined by a period of time, the timeline being populated with (b) instances and (d) instances.

7. The method of claim 4, further comprising locating a threat neutralization indicator on the timeline, the threat neutralization indicator illustrating a point in time where the cloud-based threat detection system neutralized an actuated malicious attack.

8. The method of claim 1, wherein the rendering includes populating the threat dashboard with a list of threat instances where the users encountered the particular malicious attack or actuated the particular malicious attack, wherein the list is organized such that instances where the users actuated the particular malicious attack are displayed above instances where the users encountered but did not actuate the particular malicious attack.

9. The method of claim 1, wherein the rendering includes assembling a threat source list comprising a ranked listing of malicious attacks arranged according to exposure or actuation success.

10. A cloud-based threat detection system for providing a threat dashboard, the system comprising:
  a processor; and
  a memory for storing logic, the logic being executed by the processor to execute operations comprising:
    preventing, via the cloud-based threat detection system, users from actuating a particular malicious attack, the particular malicious attack being from a particular malware;
    determining metrics regarding the particular malicious attack against a targeted resource, the metrics indicating:
      instances where the users actuated the particular malicious attack, and
      instances where the cloud-based threat detection system prevented the particular malicious attack from being actuated;
    rendering a threat dashboard for a web browser application of a client device, the threat dashboard comprising the metrics for the instances where the users actuated the particular malicious attack and the instances where the cloud-based threat detection system prevented the particular malicious attack from being actuated; and
    indicating on the threat dashboard whether the particular malicious attack was targeted to a particular group of the users or widespread.

11. The system of claim 10, wherein the processor further executes the logic to perform an operation of rendering a view of the targeted resource within the threat dashboard.

12. The system of claim 10, wherein the processor further executes the logic to perform an operation graphing a timeline of the metrics to illustrate:
  (a) instances where the users were exposed to the particular malicious attack;
  (b) instances where the cloud-based threat detection system prevented the users from being exposed to the particular malicious attack;
  (c) the instances where the users actuated the particular malicious attack; and
  (d) the instances where the cloud-based threat detection system prevented the particular malicious attack from being actuated.

13. The system of claim 12, wherein graphing the timeline comprises generating a two dimensional graph having a vertical axis defined by exposures and a horizontal axis defined by a period of time, the timeline being populated with (a) instances and (b) instances.

14. The system of claim 13, wherein the processor further executes the logic to perform an operation of assigning a different hue to each of the (a) instances and the (b) instances so as to visually distinguish the (a) and the (b) instances.

15. The system of claim 12, wherein graphing the timeline comprises generating a two dimensional graph having a vertical axis defined by actuations and a horizontal axis defined by a period of time, the timeline being populated with (c) instances and (d) instances.

16. The system of claim 15, further comprising assigning a different hue to each of the (c) instances and the (d) instances so as to visually distinguish the (c) and the (d) instances.

17. The system of claim 12, wherein the processor further executes the logic to perform an operation of locating a threat neutralization indicator on the timeline, the threat neutralization indicator illustrating a point in time where the cloud-based threat detection system neutralized an actuated malicious attack.

18. The system of claim 10, wherein the processor further executes the logic to perform an operation of populating the threat dashboard with a list of threat instances where the users encountered the particular malicious attack or instances where the users actuated the particular malicious attack, wherein the list is organized such that instances where the users actuated the particular malicious attack are displayed above instances where the users encountered but did not actuate the particular malicious attack.

19. The system of claim 10, wherein the targeted resource and the client device are not the same device.

* * * * *